(12) United States Patent
Feng et al.

(10) Patent No.: US 8,435,374 B2
(45) Date of Patent: May 7, 2013

(54) METHOD FOR MAKING CARBON NANOTUBE FILM

(75) Inventors: Chen Feng, Beijing (CN); Li Qian, Beijing (CN); Yu-Quan Wang, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 178 days.

(21) Appl. No.: 12/856,770

(22) Filed: Aug. 16, 2010

(65) Prior Publication Data
US 2011/0155312 A1 Jun. 30, 2011

(30) Foreign Application Priority Data

Dec. 28, 2009 (CN) .......................... 2009 1 0260285

(51) Int. Cl.
*B29C 65/00* (2006.01)
*B32B 37/00* (2006.01)

(52) U.S. Cl.
USPC ........... 156/229; 156/256; 156/248; 156/249; 156/264; 156/265; 977/742; 977/842

(58) Field of Classification Search ................... 156/248, 156/249, 229, 267, 270, 264, 265, 256; 361/231; 997/742, 842
See application file for complete search history.

(56) References Cited

U.S. PATENT DOCUMENTS

| 2,849,676 | A | * | 8/1958 | Collins | 324/695 |
| 7,710,649 | B2 | | 5/2010 | Feng et al. | |
| 7,992,616 | B2 | * | 8/2011 | Liu et al. | 156/495 |
| 2010/0282403 | A1 | | 11/2010 | Liu et al. | |
| 2011/0155295 | A1 | * | 6/2011 | Fan et al. | 156/60 |
| 2011/0181996 | A1 | * | 7/2011 | Caffarella | 361/231 |

FOREIGN PATENT DOCUMENTS

| CN | 101407312 | | 4/2009 |
| JP | 2002-279389 | * | 9/2002 |
| JP | 2004107059 | | 4/2004 |

* cited by examiner

*Primary Examiner* — Linda L Gray
(74) *Attorney, Agent, or Firm* — Altis Law Group, Inc.

(57) ABSTRACT

A method for making a carbon nanotube film includes fabricating a carbon nanotube array grown on a substrate. A drawing tool and a supporting member, having a surface carrying static charges, are provided. The static charges of the surface of the supporting member are neutralized. A plurality of carbon nanotubes in the carbon nanotube array is contacted and chosen by the drawing tool. The drawing tool is then moved along a direction away from the carbon nanotube array, thereby pulling out a carbon nanotube film. The carbon nanotube film is adhered the surface of the supporting member.

17 Claims, 5 Drawing Sheets

METHOD FOR MAKING CARBON NANOTUBE FILM

CROSS-REFERENCE TO RELATED APPLICATIONS

This application claims all benefits accruing under 35 U.S.C. §119 from China Patent Application No. 200910260285.1, filed on Dec. 28, 2009, in the China Intellectual Property Office, the contents of which are hereby incorporated by reference.

BACKGROUND

1. Technical Field

The present disclosure relates to a method for making a carbon nanotube film.

2. Description of Related Art

Carbon nanotubes (CNTs) are a novel carbonaceous material and have received a great deal of interest since the early 1990s. Carbon nanotubes have interesting and potentially useful electrical and mechanical properties. Due to these and other properties, CNTs have become an important new material for use in a variety of fields. However, the acquired CNTs are generally in a form of particles or powder and that is inconvenient for applications, unlike a carbon nanotube film.

In one method for making a carbon nanotube film, the carbon nanotube film is pulled out from a carbon nanotube array by using a drawing device, and the carbon nanotube film is then adhered on a surface of a supporting member. A material of the supporting member can be plastic or rubber. However, the plastic or rubber generates static charges, which creates an interaction force between charges when the carbon nanotube film is adhered on the surface of the supporting member. Thus, the carbon nanotube film is unevenly adhered on the surface of the supporting member. For example, stripes emerge on the surface of the carbon nanotube film, which can induce breakage of the carbon nanotube film in application.

What is needed, therefore, is to provide a method for making a carbon nanotube film, by which the carbon nanotube film can be evenly adhered on a surface of a supporting member.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
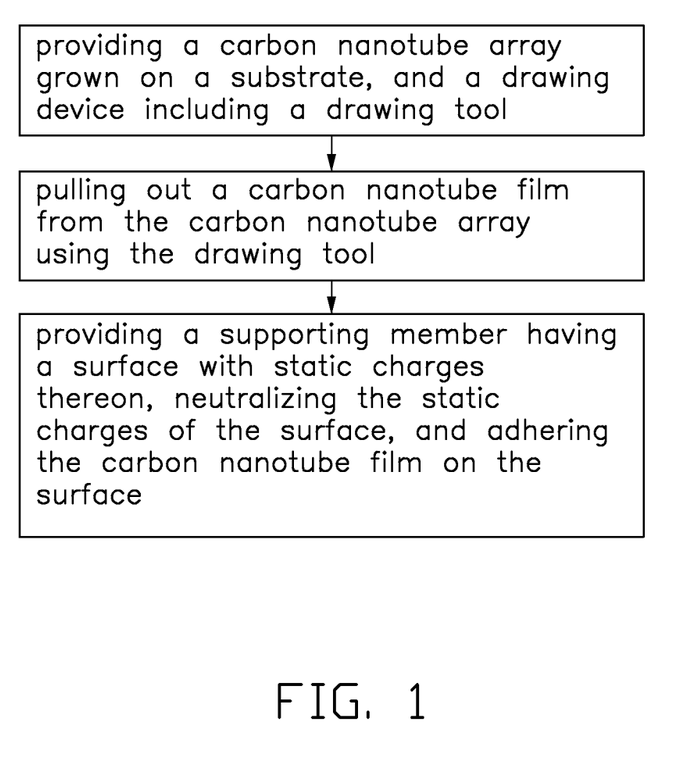
FIG. 1 is a flow chart of a method for making a carbon nanotube film, in accordance with a first embodiment.
Figure 2:
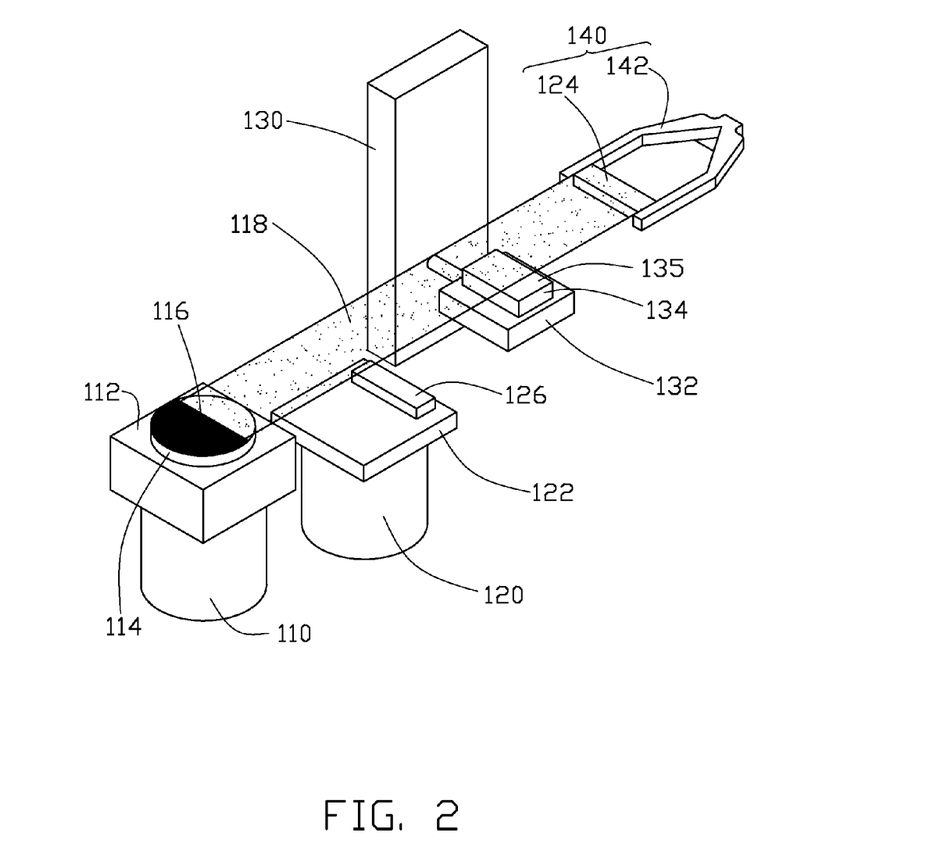
FIG. 2 is a schematic view of a process of the method of FIG. 1.

Referring to FIGS. 1 and 2, a first embodiment of a method for making a carbon nanotube film includes the following steps of:

(S1) providing a carbon nanotube array 116 grown on a substrate 114, and a drawing device including a drawing tool 140;

(S2) pulling out a carbon nanotube film 118 from the carbon nanotube array 116 using the drawing tool 140; and (S3) providing a supporting member 134 having a surface 135 with static charges thereon, neutralizing the static charges of the surface 135, and adhering the carbon nanotube film 118 on the surface 135.

In step (S1), the carbon nanotube array 116 can be a super-aligned carbon nanotube array, and the super-aligned carbon nanotube array can be made by a chemical vapor deposition (CVD) method. The CVD method includes the sub-steps of:

(S11) providing a substrate 114;

(S12) uniformly forming a catalyst layer on a surface of the substrate 114;

(S13) annealing the substrate 114 with the catalyst layer at an annealing temperature in a range from about 700° C. to about 900° C. in air for about 30 to about 90 minutes;

(S14) heating the substrate 114 with the catalyst layer up to a heating temperature of about 500° C. to about 740° C. in a furnace provided with a protective gas; and (S15) supplying a carbon source gas into the furnace for about 5 to about 30 minutes at the heating temperature and growing a super-aligned carbon nanotube array from the substrate 114.

In step (S11), the substrate 114 can be a quartz wafer, a heat-resistant glass, a P-type silicon wafer, an N-type silicon wafer, or a silicon wafer with a film of silicon dioxide thereon. In one embodiment, the substrate 114 is a P-type silicon wafer. In step (S12), the catalyst layer can be made of iron (Fe), cobalt (Co), nickel (Ni), or any alloy thereof. In step (S14), the protective gas can be at least one of nitrogen ($N_2$), ammonia ($NH_3$), and an inert gas. In step (S15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned carbon nanotube array can have a height of about 200 to 400 microns and includes a plurality of carbon nanotubes substantially parallel to each other and approximately perpendicular to the substrate 114. The super-aligned carbon nanotube array formed under the above conditions is essentially free of impurities, such as carbonaceous or residual catalyst particles. The carbon nanotubes in the super-aligned carbon nanotube array are closely packed together by the Van der Waals attractive force.

The step (S1) can further include a sub-step of providing a substrate holder 110 and fixing the substrate 114 on the substrate holder 110. The substrate holder 110 is a fixing device for supporting and fixing the substrate 114. The substrate holder 110 has a flat surface 112, and the substrate 114 with the carbon nanotube array 116 formed thereon, can be fixed, with an adhesive, on the flat surface 112 of the substrate holder 110.

The drawing tool 140 includes a drawing element used for directly pulling out the carbon nanotube film 118 from the carbon nanotube array 116. The drawing element can be a plier, a clamp, an adhesive tape, or a bar with adhesive layer on at least one surface thereof. The bar can be strip-shaped or cube-shaped. The material of the bar can be made of rigid material, such as metal, glass, rubber, or plastic. If the drawing element is a bar, the drawing tool 140 can further include a fixing device 142 to clamp the two ends of the bar. The fixing device 142 can be a U-shaped clamp with an adjustable opening facing the carbon nanotube array 116. The fixing device 142 can be controlled to move up and down or in a plane. The moving direction and speed of the fixing device 142 can be adjusted via the computer. In operation, the bar can be disposed at the opening of the U-shaped clamp, and the width of the opening can be adjusted to clamp the two ends of the bar. The bar can contact the carbon nanotube array 116 and allow carbon nanotubes to adhere thereon, and then move along a direction away from the carbon nanotube array 116, by moving the fixing device 142, thereby pulling out the carbon nanotube film 118 from the carbon nanotube array 116.

Furthermore, the drawing device can include a bar supply device 120. The bar supply device 120 and the drawing tool 140 are arranged in series at one side of the substrate holder 110. The bar supply device 120 is adjacent to the substrate holder 110.

The bar supply device 120 can be used for providing the bars and includes a supply stage 122. The supply stage 122 can be raised or can be lowered manually or by computer control, and kept to supply bars continuously during the production of the carbon nanotube films 118.

In step (S2), if the drawing device only includes a drawing element, such as a first bar 124, the method for making the carbon nanotube film 118 using the drawing tool 140 includes the sub-steps of: (S21a) contacting and choosing a carbon nanotube segment from the carbon nanotube array 116 using the drawing element; and (S22a) moving the drawing element along a direction away from the carbon nanotube array 116, thereby pulling out a carbon nanotube film 118. In step (S21a), the carbon nanotube segment is a portion of the carbon nanotube array 116 directly adhered by the drawing element. In step (S22a), the selected carbon nanotube segment moves with the motion of the drawing element, and the carbon nanotubes are gradually and continuously pulled away from the carbon nanotube array 116. The carbon nanotubes pulled away from the substrate 114 are joined end to end by Van der Waals attractive force to form the carbon nanotube film.

If the drawing device further includes the bar supply device 120, and the drawing tool 140 further includes a fixing device 142, the method for making the carbon nanotube film 118 using the drawing device includes the following sub-steps of:

(S21b) moving a first bar 124 provided by the bar supply device 120 toward the carbon nanotube array 116, and adhering a plurality of carbon nanotubes in the carbon nanotube array 116 via the first bar 124 to select the carbon nanotube segments;

(S22b) pulling the first bar 124 along a direction away from the carbon nanotube array 116, thereby forming the carbon nanotube film 118;

(S23b) fixing the first bar 124 on the fixing device 142;

(S24b) providing a second bar 126 by the bar supply device 120, and adhering a portion of the carbon nanotube film 118 on the second bar 126.

In step (S21b), the plurality of carbon nanotubes can be adhered on a surface of the first bar 124 with adhesive.

In step (S22b), an angle between the pulling direction and the growing direction of the carbon nanotube array 116 is in a range from about 30° to about 90°. A pulling speed of the first bar 124 is in a range from about 1 mm/s to about 100 mm/s In the process of the pulling, the plurality of carbon nanotubes adhered on the first bar 124 are pulled away from the substrate 114, and a plurality of subsequent carbon nanotubes adjacent to the adhered carbon nanotubes are also pulled away from the substrate 114 due to Van der Waal attractive force between carbon nanotubes. Thus, the carbon nanotubes in the carbon nanotube array 116 can be continuously pulled away from the substrate 114 end-to-end via Van der Waals attractive force, thereby forming the carbon nanotube film 118. The carbon nanotube film 118 includes a plurality of carbon nanotubes joined end-to-end by Van der Waals attractive force. The carbon nanotubes substantially align along the pulling direction. The width and the length of the carbon nanotube film 118 are related to the dimension of the substrate 114 and can be made as desired. The carbon nanotube array 116 is free of impurities, and the carbon nanotubes have a high specific surface area and a high viscosity. As such, the carbon nanotube film 118 can be directly adhered to the surface of the bar.

In step (S24b), the second bar 126 can adhere at the bottom of the carbon nanotube film 118 by adjusting the height of the bar supply device 120. The carbon nanotube film 118 between the first bar 124 and the second bar 126 is suspended above the supporting member 134 and is obtained by cutting using a laser light.

In the above drawing device, the bar supply device 120 and the drawing tool 140 can realize semi-automatic continuous production and mass production by being controlled by a computer.

In step (S3), a carrier device 130 including a carrier stage 132 can further be provided to support the supporting member 134. The carrier device 130 is disposed between the bar supply device 120 and the drawing tool 140. The carrier stage 132 can move in a plane, and can rotate about a central axis, and can also be raised or lowered by computer control. In operation, the supporting member 134 is disposed on the carrier stage 132.

The supporting member 134, which can support the carbon nanotube film 118, has a predetermined shape, such as a plate shape or frame shape. The material of the supporting member 134 can be metal, plastic glass, or rubber. In one embodiment, the supporting member 134 is a plastic plate. The surface of the supporting member 134 can carry static charges, such as positive charges or negative charges, according to environmental conditions.

Figure 3:
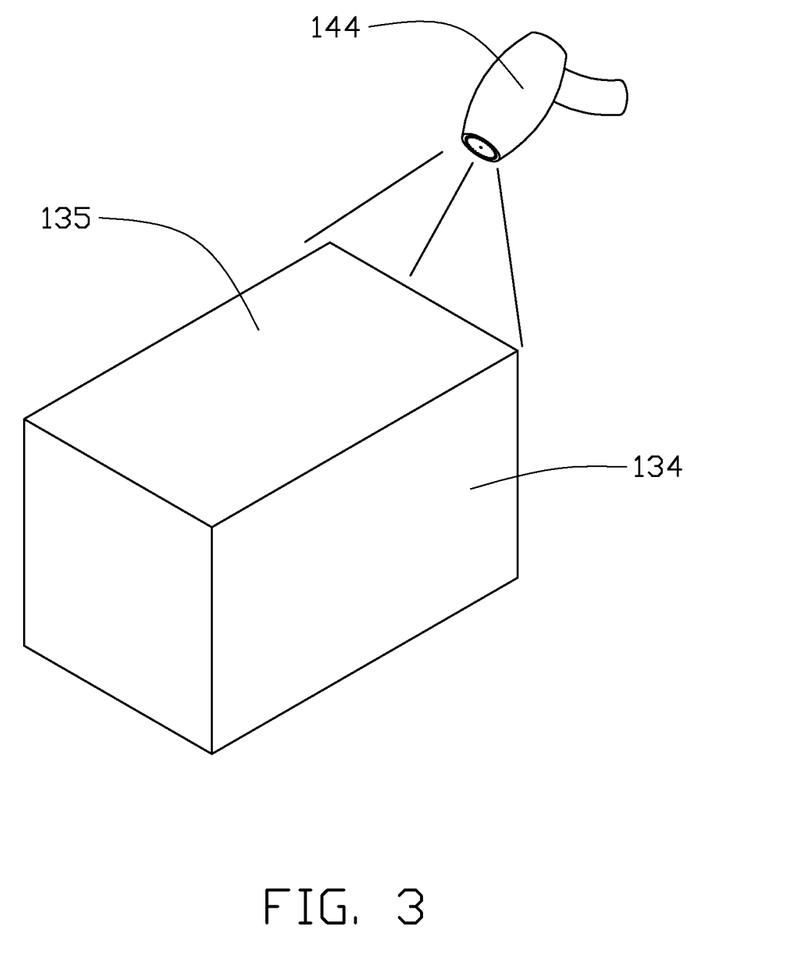
FIG. 3 is a schematic view of a process for neutralizing static charges of a surface of a supporting member, using an antistatic device, before adhering the carbon nanotube film on the surface, in accordance with the first embodiment.

The static charges on the surface 135 of the supporting member 134 can be neutralized by at least one of the following embodiments:

(M1) neutralizing the charges distributed on the surface 135 of the supporting member 134 using an antistatic device 144;

(M2) grounding the surface 135 of the supporting member 134, thereby transferring the charges of the surface 135 to the ground; or (M3) grounding the carbon nanotube film 118 adhered on the supporting member 134.

Referring to FIG. 3, in embodiment (M1), the antistatic device 144 can be an ionizing air blower, ionizing air gun, or ionizing air nozzle. In one embodiment, the antistatic device 144 is an ionizing air blower. The antistatic device 144 can generate an air flow with positive charges and negative charges. In operation, before or in the process of adhering the carbon nanotube film 118 on the surface 135 of the supporting member 134, the surface 135 can be blown by the antistatic device 144. As a result, the static charges of the surface 135 of the supporting member 134 can be neutralized by the charges in the air flow generated by the antistatic device 144. Specifically, when the surface 135 of the supporting member 134 carries positive charges, the positive charges can be neutralized by the negative charges in the air flow generated by the antistatic device 144. If the surface 135 of the supporting member 134 carries negative charges, the negative charges can be neutralized by the positive charges of in the air flow generated by the antistatic device 144.

Figure 4:
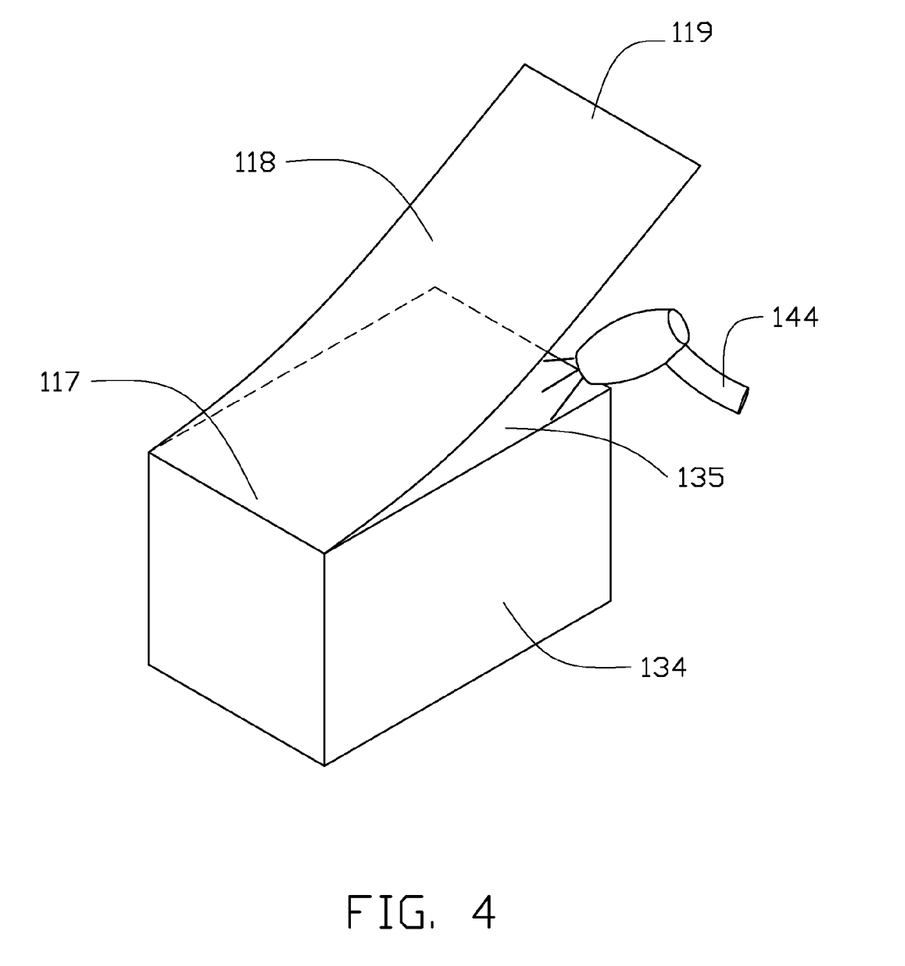
FIG. 4 is a schematic view of a process for neutralizing static charges of a surface of a supporting member, using an antistatic device, in a process of adhering the carbon nanotube film on the surface, in accordance with the first embodiment.

Referring to FIG. 4, the method for neutralizing the charges of the surface 135 of the supporting member 134, in the process of adhering the carbon nanotube film 118, includes the following sub-steps of: (S31) adhering a first end 117 of the carbon nanotube film 118 on the surface 135 of the supporting member 134; (S32) moving a second end 119 opposite to the first end 117 of the carbon nanotube film 118 toward the surface 135 of the supporting member 134, while the static charges of the surface 135 are neutralized using the antistatic device 144. The carbon nanotube film 118 is gradually adhered on the surface 135 of the supporting member 134, along a direction from the first end 117 to the second end 119 of the carbon nanotube film 118.

In step (S32), the static charges of the surface 135 of the supporting member 134 are gradually neutralized along a direction from the first end 117 to the second end 119 of the carbon nanotube film 118, using the antistatic device 144. Meanwhile, the carbon nanotube film 118 is gradually adhered on the surface 135, on which the static charges have been neutralized, along a direction from the first end 117 to the second end 119 of the carbon nanotube film 118.

The antistatic device 144 can be disposed in a space, between the surface 135 of the supporting member 134 and the carbon nanotube film 118 prior to being adhered on the surface 135. In one embodiment, the direction of the blowing air generated by the antistatic device 144 is substantially parallel to the surface 135 of the supporting member 134, and substantially perpendicular to the direction from the first end to the second end of the carbon nanotube film 118. Thereby avoiding directly blowing the carbon nanotube film 118 with the air flow generated by the antistatic device 144.

In embodiment (M2), the surface 135 of the supporting member 134 can be grounded by electrically connecting the surface 135 with a ground, as such, the surface 135 of the supporting member 134 is isopotential with the earth. Thus, the static charges of the surface 135 of the supporting member 134 can be transferred to the earth.

In one embodiment, the carrier stage 132 is made of metal and grounded. When the supporting member 134 is disposed on the carrier stage 132, the charges of the surface 135 of the supporting member 134 can be transferred to ground by the carrier stage 132.

In embodiment (M3), a grounded conductor can be electrically connected to the carbon nanotube film 118 that is to be adhered on the surface 135 of the supporting member 134. For example, a grounded metal clamp tool can clamp the two ends of the carbon nanotube film 118. In one embodiment, the bar adhered on the carbon nanotube film 118 can be made of metal, and are grounded, thereby grounding the carbon nanotube film 118. Specially, the charges distributed on the surface 135 of the supporting member 134 can be easily transferred to ground by the grounded carbon nanotube film 118, which is adhered on the surface 135, because the carbon nanotubes in the carbon nanotube film 118 have good conductivity.

Furthermore, the relative humidity of the air can be controlled in a range from about 50% to about 60%. The higher the relative humidity of the air, the smaller the surface resistivity of the supporting member 134, and the higher the surface conductivity of the supporting member 134. Thus, the charges carried by the surface 135 of the supporting member 134 can be easily neutralized.

In addition, the supporting member 134 can be disposed on the carrier stage 132, and below the carbon nanotube film 118 between the first bar 124 and the second bar 126, by adjusting the position of the carrier stage 132. The bottom of the carbon nanotube film 118 can be sufficiently adhered on the supporting member 134 by adjusting the relative position of the carrier stage 132 and the fixing device 142.

An additional step (S4) of cutting the carbon nanotube film 118 along borders of the supporting member 134 can be further processed. In step (S4), the carbon nanotube film 118 adhered on the supporting member 134 can be cut along the borders of the supporting member 134. Thus, one portion of the carbon nanotube film 118 is adhered on the supporting member 134, and the other portion of the carbon nanotube film 118 between the carbon nanotube array 116 and the second bar 126 is kept in a state of stretching. In addition, a plurality of carbon nanotube films 118 can be accumulated on the supporting member 134 by repeating the above steps. The carbon nanotube films 118 can overlap with each other to form a multi-layer carbon nanotube film structure. The angle between the aligned directions of the carbon nanotubes in the two adjacent carbon nanotube films 118 can be adjusted by rotating the carrier stage 132 in a horizontal surface. A method for making the multi-layer carbon nanotube film structure includes the sub-steps of:

(S41), fixing the second bar 126 on the drawing device 140, and pulling the carbon nanotube film 118 by drawing the second bar 126;

(S42), providing a third bar on the supply stage 122 of the bar supply device 120, and adhering a portion of the carbon nanotube film 118 on the third bar;

(S43), adjusting the height of the supporting member 134 and adhering the carbon nanotube film 118, between the second bar 124 and the third bar, on the supporting member 134; and (S44), cutting the carbon nanotube film 118 along the borders of the supporting member 134.

Figure 5:
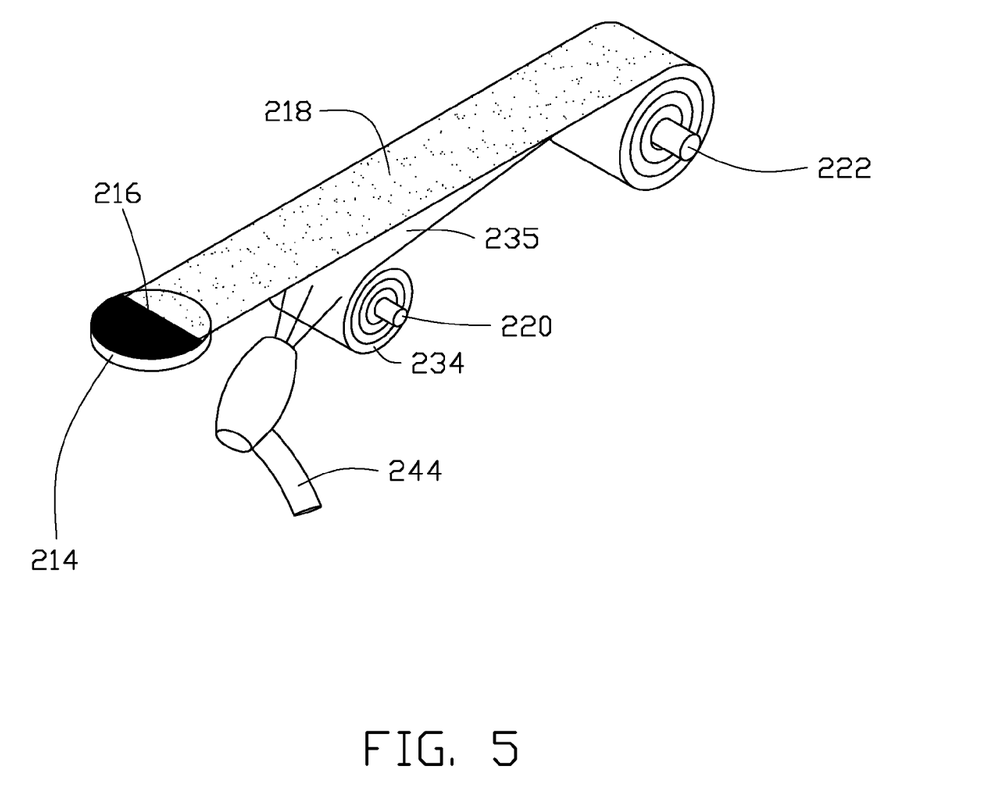
FIG. 5 is a schematic view of a process for neutralizing static charges of a surface of a wound supporting member having a large area, using an antistatic device, in an adhering process of a carbon nanotube film, in accordance with a second embodiment.

Referring to FIG. 5, a second embodiment of a method for making the carbon nanotube film includes the following steps of:

(B1), providing a carbon nanotube array 216 grown on a substrate 214 and a drawing device including a drawing tool;

(B2), pulling out a carbon nanotube film 218 from the carbon nanotube array 216 using the drawing tool; and (B3), providing a supporting member 234 having a surface 235 with static charges thereon, and neutralizing the static charges of the first surface 235, and adhering the carbon nanotube film 218 on the surface 235.

An additional step (B4) of cutting the carbon nanotube film 218 along borders of the supporting member 234 can be further processed.

The steps (B1), (B2) and (B4) are the same as the steps (S1), (S2) and (S4) of the first embodiment, the step (B3) is different from the step (S3).

In step (B3), the supporting member 234 is a flexible substrate wound around a first reel 220. The flexible substrate has a second surface opposite to the first surface 235. The material of the flexible substrate can be made of flexible rubber. An antistatic device 244, in the adhering process of the carbon nanotube film 218 on the surface 235, can neutralize the static charges distributed on the first surface 235.

Specifically, the step of neutralizing the static charges includes the following sub-steps of:

(B31), adhering one end of the carbon nanotube film 218 on the first surface 235 of the flexible substrate;

(B32), continuously drawing the flexible substrate away from the first reel 200 along the substantially same direction as the pulling direction of the carbon nanotube film 218, thereby continuously unfolding the flexible substrate; and (B33), continuously neutralizing the static charges distributed on the first surface 235 of the unfolded portion of the flexible substrate, and adhering continuously the carbon nanotube film 218 on the neutralized first surface 235 of the unfolded portion of the flexible substrate.

In sub-step (B33), an antistatic device 244 can be provided to generate an air flow with positive and negative charges. The static charges energized on the first surface 235 can be neutralized by blowing the first surface 235 using the antistatic device 244. The carbon nanotube film 218 can be continuously pulled out from the carbon nanotube array 216. Subsequently, the carbon nanotube film 218 can be continuously adhered on the first surface 235 of the unfolded portion of the flexible substrate.

Furthermore, a second reel 222 can be provided. The supporting member 234 covered by the carbon nanotube film 218 can be wound around the second reel 222. The carbon nanotube film 218 is adhered to the first surface 235 and can be released from the second surface of the supporting member 234. Thus, the supporting member 234 covered by the carbon nanotube film 218 can be unfolded. In one embodiment, the second surface of the supporting member 234 has a coating made of silicon, cross-linkable silicone, paraffin, or Teflon, which provide a nonstick surface for the carbon nanotube film.

In the method for making the carbon nanotube film, the charges distributed on the surface of the supporting member can be neutralized, before or during the process of adhering the carbon nanotube film on the surface. Thus, there is no interaction force between charges when the carbon nanotube film is adhered on the surface of the supporting member, and the carbon nanotube film can be evenly adhered on the surface of the supporting member. The carbon nanotube film, evenly adhered on the surface of the supporting member, is not easily broken, and has a long lifespan in application. The charges, energized on the surface of the wound flexible supporting member having a great area, can be neutralized, thus, a carbon nanotube film can be evenly adhered on the surface of the supporting member, and a great area of carbon nanotube film can be obtained.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a carbon nanotube film, comprising:
   providing a carbon nanotube array grown on a substrate;
   pulling out a carbon nanotube film from the carbon nanotube array; and
   providing a supporting member having a surface with static charges thereon, and neutralizing the static charges of the surface, and
   adhering the carbon nanotube film on the surface which is neutralized.

2. The method as claimed in claim 1, wherein an antistatic device is provided near the surface for neutralizing the static charges.

3. The method as claimed in claim 2, wherein the antistatic device is an ionizing air blower, ionizing air gun, or ionizing air nozzle.

4. The method as claimed in claim 3, wherein an air flow, with positive charges and negative charges, generated by the antistatic device, blows the surface of the supporting member during the process of adhering the carbon nanotube film.

5. The method as claimed in claim 4, wherein the step of neutralizing the static charges and adhering the carbon nanotube film on the surface comprises the following substeps of:
   adhering a first end of the carbon nanotube film on the surface of the supporting member; and
   moving a second end opposite to the first end of the carbon nanotube film toward the surface of the supporting member, while the static charges of the surface is neutralized using the antistatic device, thereby adhering the carbon nanotube film on the surface of the supporting member, along a direction from the first end to the second end of the carbon nanotube film.

6. The method as claimed in claim 5, wherein the direction of the air flow generated by the antistatic device is approximately parallel to the surface of the supporting member, and approximately perpendicular to the direction from the first end to the second end of the carbon nanotube film.

7. The method as claimed in claim 1, wherein the surface of the supporting member is grounded for neutralizing the static charges.

8. The method as claimed in claim 1, wherein the carbon nanotube film adhered on the surface of the supporting member is grounded for neutralizing the static charges.

9. The method as claimed in claim 1, wherein a relative humidity of the air is in a range from about 50% to about 60%, in the process of adhering the carbon nanotube film.

10. The method as claimed in claim 1, wherein the step of pulling out the carbon nanotube film from the carbon nanotube array comprises the substeps of:
    providing a drawing element;
    contacting and choosing a plurality of carbon nanotubes by the drawing element;
    moving the drawing element along a direction away from the carbon nanotube array, thereby pulling out the carbon nanotube film.

11. The method as claimed in claim 1, wherein the supporting member is a flexible substrate wound around a first reel, the flexible substrate comprising a first surface and a second surface opposite to the first surface, and the step of neutralizing the static charges and adhering the carbon nanotube film on the surface comprises the substeps of:
    adhering one end of the carbon nanotube film on the first surface of the flexible substrate;
    continuously drawing the flexible substrate away from the first reel along a direction substantially the same as the pulling direction of the carbon nanotube film, thereby continuously unfolding the flexible substrate; and continuously neutralizing the static charges distributed on the first surface of the unfolded portion of the flexible substrate, and continuously adhering the carbon nanotube film on the neutralized first surface of the unfolded flexible substrate.

12. The method as claimed in claim 11, wherein the flexible substrate covered by the carbon nanotube film is wound around a second reel.

13. The method as claimed in claim 11, wherein the first surface of the unfolded flexible substrate is blown by an air flow with positive charges and negative charges for neutralizing the static charges, before adhering the carbon nanotube film.

14. The method as claimed in claim 1 further comprising cutting the carbon nanotube film along borders of the supporting member after the step of adhering.

15. The method as claimed in claim 1, wherein the step of pulling comprises drawing the carbon nanotube array with a first bar to pull out the carbon nanotube film, and adhering the carbon nanotube film on a second bar; the step of adhering the carbon nanotube film on the surface comprises adhering the carbon nanotube film between the first bar and the second bar on the surface which is neutralized of the supporting member.

16. The method as claimed in claim 15 further comprising cutting the carbon nanotube film along borders of the supporting member, thereby forming a first section of the carbon nanotube film on the surface of the supporting member.

17. The method as claimed in claim 16 further comprising:
drawing the carbon nanotube film with the second bar;
adhering the carbon nanotube film to a third bar;
adhering the carbon nanotube film between the second bar and the third bar on the first section of the carbon nanotube film; and
cutting the carbon nanotube film along the borders of the supporting member, thereby forming a second section of the carbon nanotube film overlapping the first section of the carbon nanotube film on the surface of the supporting member.

* * * * *